United States Patent [19]

Schöpf

[11] 4,175,404

[45] Nov. 27, 1979

[54] SPLINE SHAFT CONNECTION

[75] Inventor: Hans-Joachim Schöpf, Stuttgart, Fed. Rep. of Germany

[73] Assignee: Daimler-Benz Aktiengesellschaft, Fed. Rep. of Germany

[21] Appl. No.: 860,946

[22] Filed: Dec. 15, 1977

[30] Foreign Application Priority Data

Dec. 16, 1976 [DE] Fed. Rep. of Germany ....... 2656946

[51] Int. Cl.² ............................ F16D 3/18; F16D 3/54
[52] U.S. Cl. .......................................... 64/9 R; 64/1 R; 403/359
[58] Field of Search ................... 64/9 R, 1 R, 1 V; 74/411; 403/359

[56] References Cited

U.S. PATENT DOCUMENTS

| | | | |
|---|---|---|---|
| 1,891,285 | 12/1932 | Loewus | 64/9 R |
| 2,114,807 | 4/1938 | McCavitt | 64/9 R |
| 2,590,169 | 3/1952 | Fritz | 64/1 V |
| 2,638,011 | 5/1953 | Smith | 64/9 R |
| 3,180,169 | 4/1965 | Wildhaber | 74/411 |
| 3,360,961 | 1/1968 | Steiner | 403/359 |
| 3,636,792 | 1/1972 | Vigh | 74/411 |
| 4,073,160 | 2/1978 | Perret | 64/9 R |

FOREIGN PATENT DOCUMENTS 398782 1/1974 U.S.S.R. ..................................... 64/9 R

Primary Examiner—Charles J. Myhre
Assistant Examiner—R. C. Turner
Attorney, Agent, or Firm—Craig and Antonelli

[57] ABSTRACT

A spline shaft connection between a shaft and a hub with a large number of axially extending teeth and tooth gaps respectively counter-teeth and counter-tooth gaps which form-lockingly engage with one another, whereby a tooth flank clearance is provided between the flanks of mutually contacting teeth and counter-teeth that becomes larger in the direction of the axial extent; the teeth and counter-teeth engage into one another at least approximately uniformly without clearance at least over a small fraction of the axial extent of the spline shaft connection while the remaining part of the axial extent is constructed with a tooth flank clearance that becomes larger in the direction toward the end opposite the flow of forces; the enlargement of the tooth flank clearance thereby follows a law, pursuant to which the tooth flank clearance is a function of the axial coordinate whose first derivative is equal to zero along the axial coordinate at the location of the beginning of the clearance enlargement.

10 Claims, 6 Drawing Figures

SPLINE SHAFT CONNECTION

The present invention relates to a spline shaft connection of the type disclosed, for example, in the German Pat. No. 1,425,231, (which corresponds to U.S. Pat. No. 3,360,961), for connecting a shaft to a hub, and in which a tooth flank clearance is provided which becomes larger in the direction of the axial dimension.

The aim of the spline shaft connection disclosed in the German Pat. No. 1,425,231 was to increase the length of life of the spline shaft connection by an intentional dimensioning of the tooth flank clearance that changes over the axial extent of the spline shaft connection. For that reason, a tooth flank clearance which changed linearly over the entire extent of the connection was provided in this prior art spline shaft connection, whereby the maximum tooth flank clearance was of the order of magnitude of the maximum tooth deformation or of the maximum shaft torsion under load.

This construction of the spline tooth connection has various disadvantages: On the one hand, by reason of the required circumferential centering of the shaft and hub, this type of construction is possible only by very accurately machined circumferential surfaces and more particularly by cutting machining, i.e., by machining involving the removal of material.

This presupposes a corresponding material-removing machining operation which is unacceptably expensive at least with the mass-production of such connections. Furthermore, it has been shown in practice that distinct stress peaks cannot be avoided with such measures on the side of the spline shaft connection facing the force flow and fatigue failures stemming therefrom cannot be avoided.

It is the aim of the present invention to so strongly decrease stress peaks in the splined shaft connections of the aforementioned type that fatigue failures normally need no longer be feared also without costly measures on the material that increase the endurance strength. The underlying problems are solved according to the present invention in that the teeth and counter-teeth engage at least over a small fraction of the axial extent of the splined shaft connection at least approximately uniformly clearance-free with one another and are constructed over the remaining part of the axial extent with a tooth flank clearance that becomes wider in the direction toward the end of the splined shaft connection opposite the direction of flow of the forces, whereby the enlargement of the tooth flank clearance takes place according to a law, pursuant to which the tooth flank clearance follows a function of the axial coordinate such that the first derivative of the clearance enlargement function is equal to zero along the axial coordinate at the place of the beginning of the clearance enlargement.

Due to the fact that the tooth flanks will lift-off tangentially from one another at the beginning of the clearance enlargement, this will lead in case of a load to a flattening of the tooth flank constructed curved in the axial direction by reason of the deformation and therewith to a gradual load-dependent lengthening of the contact length. As to the rest, the place of largest stress is distributed axially over a larger area by the curvature of the tooth flank in the axial direction and by the tangential lifting off. Since such splined shaft connections are stressed as a rule with a load collective, i.e., with loads of different magnitude and different frequency, the beginning of the tooth flank contact will be displaced in the axial direction corresponding to the magnitude of the load and the location of the maximum stress migrates correspondingly according to the load strength. Consequently, an axial stretching and therewith a decrease of the load peak and a distribution per unit of time of the engaging place over a larger area takes place by the construction of the spline shaft connection according to the present invention. Of course, the present invention can be applied also to spline shaft connections externally centered or self-centered along the circumference, which are manufactured as a whole or at least in part by cutting or material-removing machining. However, owing to the tangential course of the clearance enlargement and owing to the at least slight centering length resulting therefrom, in principle also a flank-centering of the spline shaft connection may be provided. A particular advantage resides therein for the large series application since shaft serrations or teeth which are made by machining without material removal, for example, by conventional longitudinal or transverse rolling methods, have to be manufactured very accurately only as regards the flank shape and the tooth thickness but not as regards the addendum or tooth tip diameter. The applicability of the flank-centering to the spline shaft connection according to the present invention is a particular advantage for its application to mass production.

Accordingly, it is an object of the present invention to provide a splined shaft connection which avoids by simple means the aforementioned shortcomings and drawbacks encountered in the prior art.

Another object of the present invention resides in a spline shaft connection in which complicated, costly material-removing machining operations can be far-reachingly obviated without impairing the length of life of the connection.

A further object of the present invention resides in a spline shaft connection which lends itself extraordinarily well to mass production techniques.

Still a further object of the present invention resides in a simple spline shaft connection which far-reachingly eliminates fatigue failures and permits a tooth-flank centering between the meshing parts.

These and other objects, features and advantages of the present invention will become more apparent from the following description when taken in connection with the accompanying drawing which shows, for purposes of illustration only, two embodiments in accordance with the present invention, and wherein.

Figure 5:
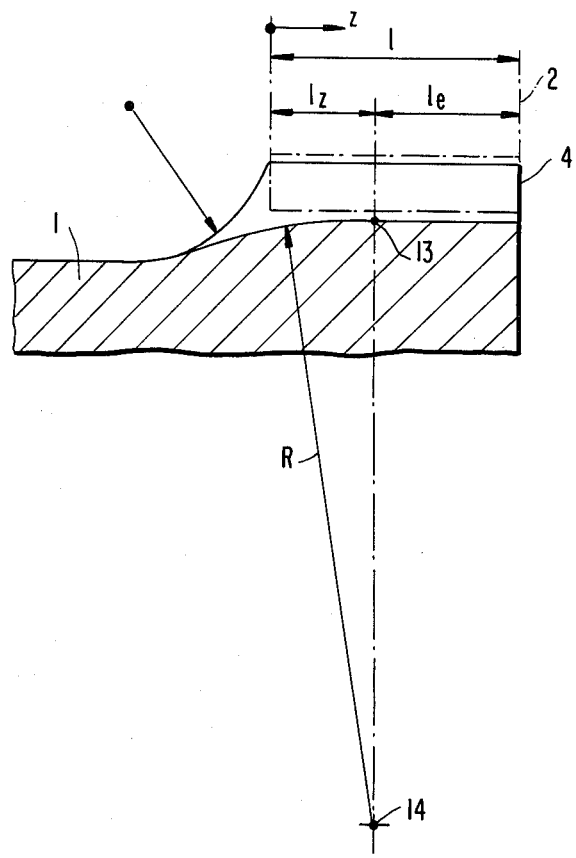
Figure 6:
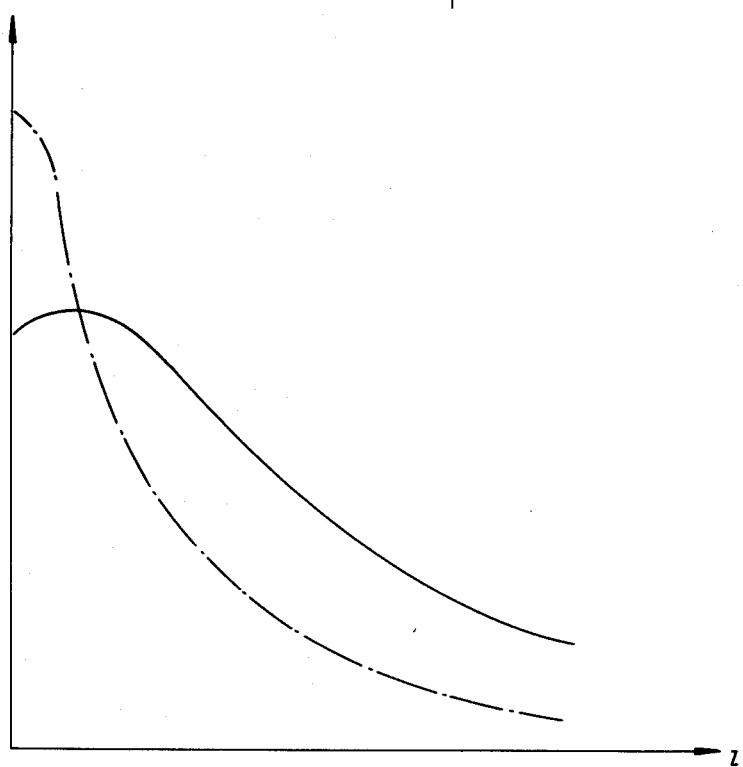

FIG. 5 is a partial axial cross-sectional view through a further embodiment of a spline shaft connection in accordance with the present invention with a spline tooth projecting out of the shaft contour; and FIG. 6 is a diagram illustrating the stress curve along the axial dimension of the splined shaft connection in prior art spline shaft connections and in splined shaft connections according to the present invention.

Figure 1:
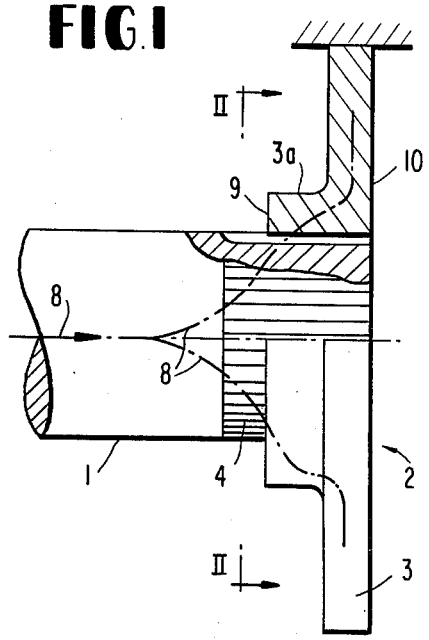
FIG. 1 is a somewhat schematic side elevational view, partly in cross section, of a spline shaft connection in accordance with the present invention.
Figure 2:
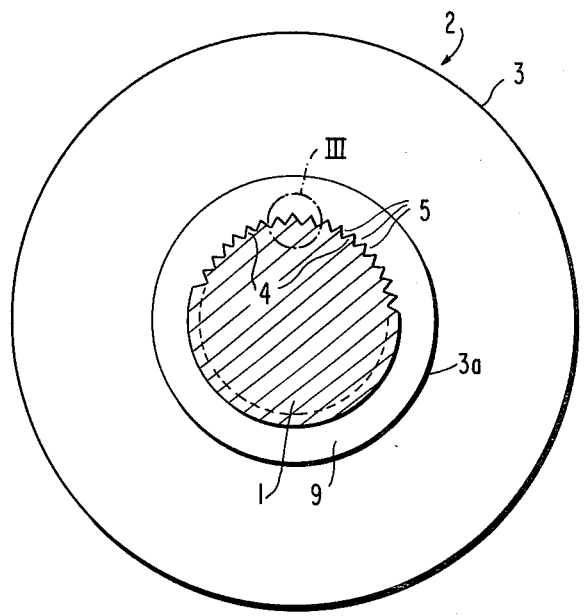
FIG. 2 is a cross-sectional view through the shaft at right angle to the shaft axis and taken along line II—II of FIG. 1, with an axial view on the splined shaft connection.
Figure 3:
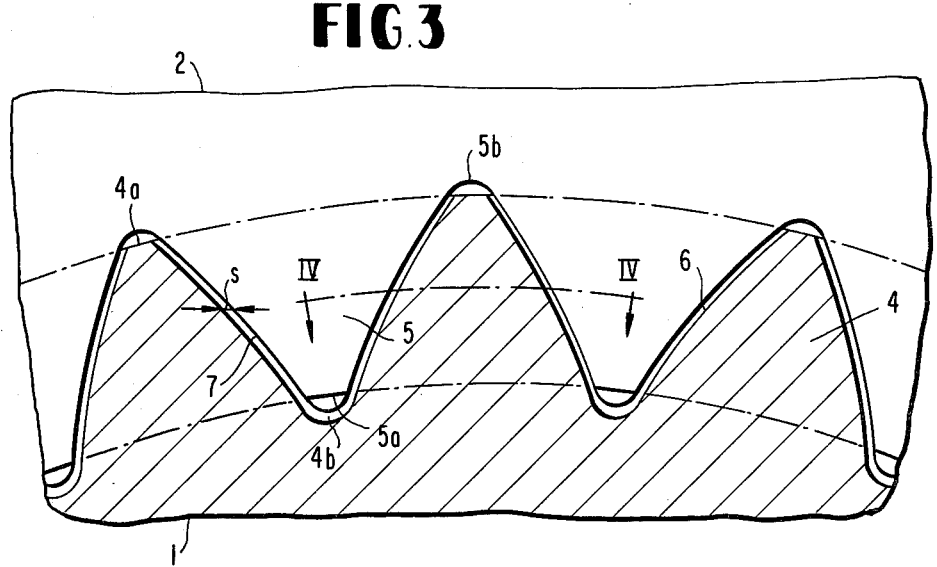
FIG. 3 is a partial cross-sectional view, illustrating the details of the parts in the spline shaft connection of the present invention located in the dash-and-dot circle III of FIG. 2.

Referring now to the drawing wherein like reference numerals are used throughout the various views to designate like parts, in the spline shaft connection illustrated in FIGS. 1 and 2, a shaft 1 and a hub 2 are form-lockingly connected with each other by serrations or spline teeth 4 and 5. The hub 2 consists of a hub flange 3 and of a hub shoulder 3a. The spline teeth or serrations 4 are provided at one end of the shaft 1, which in the embodiment according to FIGS. 1 to 4 are constructed as machined-in serrations or teeth. Correspondingly, an internal toothed arrangement 5 is provided on the inside of the hub 3. The teeth 4 and 5 are constructed with involute-shaped flanks and can therefore be accurately manufactured to exact dimensions by means of tools having rectilinear flanks in the milling or hobbing method. Appropriately, the shaft teeth are made by a non-cutting rolling or hobbing method between two correspondingly formed tooth rack tools; this type of manufacture is particularly suited for mass production. Spline teeth with very high tooth strength and great flank accuracy can thus be made within every desired tolerance condition. Whereas the tooth flanks 6 can be manufactured very accurately by such a rolling or hobbing operation without removal of material, larger tolerance widths have to be accepted for the diameter condition of the tooth tips 4a and for the tooth roots 4b of the serrations or spline teeth 4. The hub serrations or teeth 5 are appropriately made by a broaching method. The hub addenda or tooth tips 5a result thereby from the inner diameter of the hub which initially has been premachined by cutting or material-removal; the diameter condition of the hub tooth tips or addenda 5a can therefore be kept within very narrow tolerances. The hub tooth roots 5b serve as machining termination for the hub tooth flanks 7; they are unsuitable by reason of this shape for a circumferential-centering of the tooth arrangement.

The place of maximum stress of the spline-tooth arrangement is isolated on the end face 9 (FIG. 1) of the spline shaft connection facing the force flow 8; the relieved end face of the connection is the side 10 (FIG. 1). Of the two serrations or toothed arrangements 4 and 5, which are in meshing engagement, the shaft serrations or teeth 4 are unequivocally the more highly stressed ones. Normally, a stress peak occurs under load in the shaft teeth at the place 9.

Figure 4:
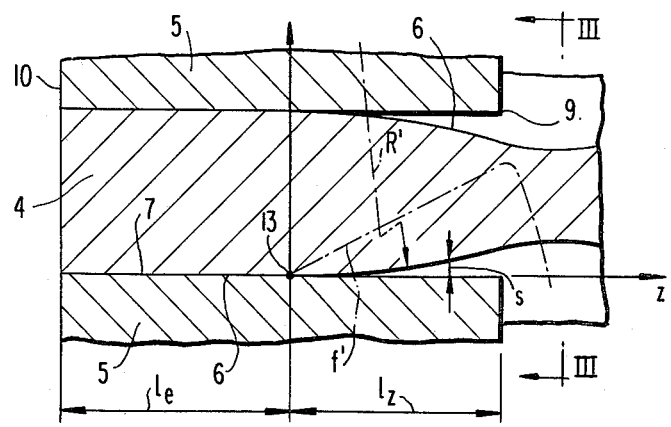
FIG. 4 is a developed cylinder section, taken along line IV—IV of FIG. 3, whereby the flank clearance is illustrated strongly exaggerated in the circumferential direction.

For purposes of a reduction and for the axial extending of this stress peak, according to the present invention, the tooth flanks 6 of the shaft teeth 4 are cut tangentially in the direction toward the stressed side 9 of the splined shaft connection. The cut is limited only to a partial area-cut length $1_z$ (FIG. 4)—of the axial constructional length of the spline shaft connection. Within the remaining area—centering length $1_e$—the teeth 4 and the counter-teeth 5 are fitted into one another clearance-free, i.e., with transitional fit or overlap; the spline shaft connection will center itself by reason of the teeth abutting at one another at the flanks. At the transitional place 13 (FIG. 4) between the centering length $1_e$ and the cutting length $1_z$, the flank 6 of the shaft tooth 4 which becomes narrower, lifts off tangentially from the hub tooth 5 constructed strictly prismatically over the entire length respectively from the flank 7 thereof. The contour of the tooth flank as viewed in the cylinder cross section of FIG. 4 has a circularly shaped contour, as is clearly indicated in FIG. 4 by the radius arrow R' (radius of curvature). As a result of such a configuration, a progressively increasing flank clearance s results with increasing axial distance from the beginning 13. The tooth flank contour which is illustrated within the area of the cut length $1_z$ can be understood as graphic illustration of a mathematical relation or law concerning the tooth flank clearance as a function of the axial coordinate—clearance enlargement function. In FIG. 4, the first derivative of the tooth flank clearance is plotted as dash and dotted line f' along the axial coordinate of the clearance enlargement function. Within the area of the cutting length $1_z$, this derivative function f' can be represented with very good approximation as straight, rising line. At the beginning 13 of the cut, this line passes through zero. This means that the clearance enlargement function or the curved flank contour lifts off tangentially and very carefully from the counter flank 7. A spreading of distribution of the maximum stressed place of the toothed flanks in the axial direction results from this smooth lifting-off of the shaft tooth flank and therewith a decrease of the peak stresses. The stressed tooth flank of the shaft tooth will deform affinitively under load. As a result thereof, the beginning of the contact of the curved tooth flank is further displaced in the direction toward the stressed side 9; that is, the location of the maximum stress is not fixed locally but displaced itself in the axial direction. As a result thereof, a greater material volume is utilized for the absorption of the maximum stress, whence a noticeable material relief occurs as regards fatigue failure. It is thereby optimum if, in coarse approximation, the cut length $1_z$ is of equal length of the centering length $1_e$.

The stress curve in the axial direction is plotted in FIG. 6 along the spline shaft connection. More particularly, the stress curve with the customary spline shaft connections—dash and dotted lines—is compared to the stress curve with spline shaft connections according to the present invention—full line. The stress peak is lower by at least 30% as a result of the measures according to the present invention, and the stress curve is considerably more even than with the prior art construction.

A further embodiment of a spline shaft connection with so-called projecting shaft teeth or serrations projecting out of the circumference of the shaft is illustrated in FIG. 5. It is shown in this embodiment—with great exaggeration—how the cut with a circularly shaped configuration starts at the transition point 13 between the area of the centering length $1_e$ and the area of the cutting length $1_z$. The center of the radius of curvature 14 is located perpendicularly over the transition point 13. The involute profile is displaced radially inwardly along a circularly shaped contour—radius of curvature R.

In addition to the already mentioned advantages of a clear material relief and the applicability in the non-cutting manufacture, i.e., in the manufacture without material removal machining, the present invention offers the further advantage that by reason of a better material utilization, the dimensions of a spline shaft connection can be constructed smaller with equal load or stress magnitude, whence also more lightweight constructions result. This is particularly important in the vehicle construction. As a result of the material relief according to the present invention, even a hardening operation of the teeth of the spline shaft connection can be saved under certain circumstances. As to the rest, the advantages of the present invention can be introduced without difficulty in the manufacture with only very slight changes in the serration or tooth-making tools. It is only necessary to provide corresponding-negative-cuts at the toothed racks utilized for rolling the teeth into the shaft. This is possible without any difficulty at the present state of the art of non-cutting forming (without material removal) and at the corresponding state of the art of the machine tool construction.

While I have shown and described only two embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A spline shaft connection between a shaft and a hub with a large number of axially extending tooth and counter tooth means form-lockingly engaging into one another, a tooth flank clearance being provided between the flanks of the mutually contacting tooth and counter tooth means that becomes larger along the direction of the axial dimension and is dimensioned of the order of magnitude of the elastic deformation under load of tooth or counter tooth means, characterized in that a centering length is provided wherein the tooth means and counter tooth means engages into one another at least approximately uniformly and substantially without clearance over a substantial portion of the axial extent of the spline shaft connection and are constructed in a cutting length constituting the remaining part of the axial extent with a tooth flank clearance that becomes larger in the direction toward the end of the spline shaft connection which is opposite to the flow of forces, whereby the enlargement of the tooth flank clearance follows such a relationship that the tooth flank clearance value is a function of the axial coordinate whose first derivative along the axial coordinate is substantially equal to zero at the juncture of the centering and cutting lengths.

2. A spline shaft connection according to claim 1, characterized in that the spline shaft connection is centered within the area of the centering length by way of the tooth flanks of the tooth and counter-tooth means which are in mutual engagement.

3. A spline shaft connection according to claim 2, characterized in that the remaining part of the axial extent forms the cut length.

4. A spline shaft connection according to claim 3, characterized in that the tooth means and tooth gap means of the hub of the spline shaft connection are constructed strictly prismatically over the entire axial extent and the tooth means of the shaft part are constructed within the area of the centering length also strictly prismatically with increasing width only within the area of the cut length, as viewed starting from an inner end of the centering length in a direction toward an input end of the spline shaft connection.

5. A spline shaft connection according to claim 4, characterized in that the clearance enlargement function is representable as a circular arc whose center point is located in a plane containing the beginning of the clearance enlargement and situated perpendicular to the shaft axis.

6. A spline shaft connection according to claim 5, characterized in that the tooth flanks are constructed involute-shaped.

7. A spline shaft connection according to claim 5, characterized in that the centering length is approximately equal to the cut length.

8. A spline shaft connection according to claim 1, characterized in that the clearance enlargement function is representable as a circular arc whose center point is located in a plane containing the beginning of the clearance enlargement and situated perpendicular to the shaft axis.

9. A spline shaft connection according to claim 8, characterized in that the tooth flanks are constructed involute-shaped.

10. A spline shaft connection according to claim 1, characterized in that the tooth flanks are constructed involute-shaped.

* * * * *